United States Patent [19]

Wörner et al.

[11] Patent Number: 5,277,028

[45] Date of Patent: Jan. 11, 1994

[54] HYDRAULIC FLOW CONTROL WITH TEMPERATURE SENSITIVE SPRING BIASED BYPASS VALVE

[75] Inventors: Günter Wörner, Kernen; Arno Röhringer, Ditzingen; Heiko Bublitz; Peter Lindeckert, both of Stuttgart, all of Fed. Rep. of Germany

[73] Assignee: Mercedes-Benz AG, Fed. Rep. of Germany

[21] Appl. No.: 82,820

[22] Filed: Jun. 28, 1993

Related U.S. Application Data

[63] Continuation of Ser. No. 853,889, Mar. 18, 1992, abandoned, which is a continuation of Ser. No. 674,129, Mar. 25, 1991, abandoned.

[30] Foreign Application Priority Data

Mar. 26, 1990 [DE] Fed. Rep. of Germany ....... 4009641

[51] Int. Cl.$^5$ .................... F16D 31/02; F04B 49/00
[52] U.S. Cl. ...................... 60/468; 417/292; 417/308
[58] Field of Search ............ 60/468; 91/462, 463; 417/292, 300, 308, 311; 137/117, 468, 516.12, 599.2

[56] References Cited

U.S. PATENT DOCUMENTS

| | | | |
|---|---|---|---|
| 2,791,229 | 5/1957 | Pasco | 137/117 |
| 3,146,719 | 9/1964 | Drutchas | 137/117 X |
| 3,146,720 | 9/1964 | Henry | 137/117 X |
| 4,343,324 | 8/1982 | Ohe et al. | 137/117 |
| 4,400,938 | 8/1983 | Ohe | 137/117 X |
| 4,420,934 | 12/1983 | Udono | 137/117 X |
| 4,442,857 | 4/1984 | Ohe et al. | 137/117 |
| 4,473,341 | 9/1984 | Ohe et al. | 417/308 X |
| 4,753,264 | 6/1988 | Ochino et al. | 137/117 |
| 4,778,104 | 10/1988 | Fisher | 137/468 X |
| 4,917,139 | 4/1990 | Narumi et al. | 137/117 X |
| 4,947,951 | 8/1990 | Miller | 417/300 X |

FOREIGN PATENT DOCUMENTS

| | | |
|---|---|---|
| 1132400 | 8/1960 | Fed. Rep. of Germany . |
| 3313666 | 10/1984 | Fed. Rep. of Germany . |
| 3303492 | 11/1989 | Fed. Rep. of Germany . |
| 3822970 | 1/1990 | Fed. Rep. of Germany . |
| 5596387 | 7/1980 | Japan .................... 417/292 |
| 0261788 | 11/1987 | Japan .................... 137/468 |
| 0083471 | 4/1988 | Japan .................... 137/468 |
| 63-312239 | 4/1989 | Japan . |
| 0120493 | 5/1989 | Japan .................... 137/468 |
| 0362613 | 7/1962 | Switzerland . |

Primary Examiner—Edward K. Look
Assistant Examiner—John Ryznic
Attorney, Agent, or Firm—Evenson, McKeown, Edwards & Lenahan

[57] ABSTRACT

A hydraulic flow control apparatus has shape memory alloy springs which develop substantial actuating forces only at relatively high temperature. As a result of these forces, an only relatively slightly throttled connecting path between delivery side and intake side of a pump is opened directly or indirectly.

11 Claims, 4 Drawing Sheets

HYDRAULIC FLOW CONTROL WITH TEMPERATURE SENSITIVE SPRING BIASED BYPASS VALVE

This is a continuation of application Ser. No. 07/853,889, filed Mar. 18, 1992, now abandoned which is a continuation of application Ser. No. 07/674,129, filed Mar. 25, 1991, now abandoned.

BACKGROUND AND SUMMARY OF THE INVENTION

The present invention relates to an apparatus for open-loop or closed-loop hydraulic flow control in a hydraulic system with a variable-speed pump which is connected on the intake side to a reservoir and on the delivery side via a throttle to a consumer system, for example a power-assisted steering system of a motor vehicle. A flow control piston controls a connecting path between the intake side and the delivery side of the pump and is actuated by the pressure of the delivery side into a position releasing the connecting path and by a restoring spring and the pressure downstream of the throttle into a position shutting off the connecting path. A pressure relief valve arranged on the delivery side of the pump releases with a throttling effect a connecting line leading to the intake side if a pressure threshold value is exceeded.

In the case of motor vehicle hydraulic systems, the associated hydraulic pumps are usually driven directly by the vehicle engine, so that the delivery member of the pump is driven with greatly varying speed, corresponding to the greatly varying speeds of the vehicle engine during a driving operation. In such cases, the pump is generally dimensioned in such a way that the volume flow necessary for operation of the respective hydraulic system is already generated by the idling speed of the vehicle engine. In other words, at relatively high speeds of the vehicle engine there may be a delivery capacity available which far exceeds what is required. The volume flow passed to the consumer system is then limited to the respective requirement by the flow control piston.

An apparatus of the aforementioned type for open-loop or closed-loop hydraulic flow control is described in Swiss Patent Specification 362,613 in connection with a motor vehicle power-assisted steering system. In normal operation of the power-assisted steering system, hydraulic medium constantly flows from the delivery side of the pump via the servo valve to a hydraulic reservoir. Consequently, a pressure drop occurs at the throttle connecting the servo valve to the delivery side of the pump, with the throttle being arranged and designed as part of the flow control piston. The pressure drop has the effect that a force in the opening direction is exerted on the flow control piston. Consequently, in normal operating states of the servo valve, the flow control piston can adapt the supply of hydraulic medium to the servo valve according to requirements. Depending on the requirements of the servo valve and the delivery capacity of the servo pump, a greater or lesser proportion of the hydraulic medium delivered by the pump is introduced into the connecting path to the intake side of the pump.

In extreme operating states of the servo valve, for example if a great resistance in the vehicle steering has to be overcome, no hydraulic medium can flow off via the servo valve to the hydraulic reservoir. Consequently, the pressure on the delivery side of the pump increases until the pressure relief valve opens, which in the known arrangement controls a connecting line, branching off from the delivery line of the pump upstream of the connecting path controlled by the flow control piston, to the intake side of the pump.

In particular, when the vehicle engine is running at high speed and the pump is correspondingly generating a very strong delivery flow, great quantities of the hydraulic medium flow through the pressure relief valve. For as long as the servo valve assumes an extreme operating state in which no hydraulic medium can flow via the servo valve to the hydraulic reservoir, the connecting path, controlled by the flow control piston, to the intake side of the pump also remains closed because no pressure drop can occur at the throttle leading to the servo valve. Correspondingly, no hydraulic forces can be generated which would urge the flow control piston into a position opening the connecting path.

Due to the great hydraulic flow passing through the pressure relief valve, there may be extreme heating of the pressure medium. It is very possible for the pump to be destroyed already after a relatively short time.

It is, of course, possible in theory to design the servo valve or other consumer system connected to the pump in such a way that, in all possible operating states, hydraulic medium can flow back from the delivery line via the servo valve or the consumer to the reservoir in order to ensure that an appropriate quantity of fresh and cooled hydraulic medium must always be supplied to the pump from the reservoir via the intake line. As a result, an adequate cooling of the pump could be theoretically ensured. Practically speaking, however, with such a design of the hydraulic system, a pump with increased capacity must be provided in order to be able to achieve a predetermined maximum pressure differential between intake side and delivery side of the pump. In other words, an increased drive power is required for the pump. This may cause problems in the case of motor vehicles because the vehicle engine can only deliver limited power in idling operation, at least if the idling speed is to be kept as low as possible.

In addition, in principle it would be possible to let the connecting line controlled by the pressure relief valve open out into the reservoir. Then, the hot hydraulic medium coming from the pressure relief valve could mix with the distinctly cooler hydraulic medium in the reservoir and correspondingly cooler hydraulic medium would be fed to the intake side of the pump. In this case, however, the connecting line would have to be relatively long if the reservoir is arranged some distance away. In addition, an additional connecting would have to be provided on the reservoir. If, finally, the pressure relief valve and the flow controller are to be accommodated together with the pump in a common block or housing to achieve as compact a design as possible, an additional connection for the connecting line would also have to be provided on this block as well.

The problems pointed out above have not been solved satisfactorily so far. For example, German Patent Specification 3,303,492 describes a special configuration of a flow controller in order to prevent the occurrence of flutter of the flow control piston.

German Offenlegungsschrift 3,822,970 discloses shock absorbers on which throttle valves controlling the damping resistance are provided with shape memory alloy springs whose elastic stress increases greatly at relatively high temperature and consequently increases the throttling resistance of the aforementioned valves. In this way, the damping force remains approximately constant even if the hydraulic medium in the shock absorber is heated considerably, and consequently becomes increasingly fluid.

Germany Offenlegungsschrift 3,313,666 shows a pressure control valve which is urged in the closing direction by a first spring. An additional bimetal spring opposes the bias of the first spring. This counteracting force can be controlled by heat acting on the bimetal spring. In this way, the closing pressure of the pressure control valve can be controlled externally.

Finally, in German Auslegesschrift 1,132,400 a thermostatically controlled valve is provided and has a closing body urged in the closing direction by a plurality of series-arranged different, bimetal springs. The closing pressure can thus be increased with increasing temperature.

An object of the present invention is to provide an apparatus for closed-loop or open-loop hydraulic flow control which, with a simple design, prevents an excessive temperature increase of the hydraulic medium in the pump even when the volume flow taken from the consumer system drops drastically or ceases altogether.

This object has been achieved according to the present invention with an apparatus in which the connecting line branches off downstream of the throttle and the flow control piston and/or the shut-off member of the pressure relief valve are actuated by a spring consisting of a shape memory alloy and having a pronouncedly temperature-dependent actuating force, such that the connecting path controlled by the flow control piston and the connecting line controlled by the pressure relief valve are released if the hydraulic medium exceeds a temperature threshold value.

The present invention is based on the general concept of controlling the actuating forces acting on the flow control piston and the pressure relief valve temperature-dependently by shape-memory alloy springs in order to shift the flow control piston completely into its open position if the temperature threshold value is reached. Consequently, the pump is relieved of virtually all the throttling resistances opposing the pump work, so that a further temperature increase of the hydraulic medium is reliably prevented.

Moreover, the present invention utilizes the discovery that, due to the arrangement of the branching of the connecting line downstream of the throttle, the heat of the hydraulic medium coming from the pump, which may be heated substantially, can heat a shape-memory alloy spring acting on the flow control piston and a shape-memory alloy spring of a shape memory alloy actuating the shut-off member of the pressure relief valve and consequently change the spring force significantly. In both instances, the connecting path controlled by the flow control piston is then released, and greater quantities of the hydraulic medium without excessive heating are able to flow through the path.

A particular advantage of the present invention is that the configuration of conventional apparatuses for open-loop of closed-loop hydraulic flow control only has to be modified slightly. Essentially, only at least one spring of a shape memory alloy need be additionally arranged in heat-conducting contact with the hydraulic medium.

According to a presently preferred embodiment of the invention, the shape-memory alloy spring has a greatly dropping or altogether ceasing actuating force below the temperature threshold value and a greatly increasing actuating force above the temperature threshold value, and actuates the flow control piston or the pressure relief valve respectively in the opening direction. As a result, an active opening force is exerted on the flow control piston or the pressure relief valve with increasing temperature of the hydraulic medium.

A redundant arrangement is also possible with the present invention, in that both the flow control piston and the pressure relief valve each interact with a spring of a shape memory alloy. Consequently a particularly high reliability against an excessive heating of the hydraulic medium in the pump is achieved.

BRIEF DESCRIPTION OF THE DRAWINGS

These and other objects, features and advantages of the present invention will become more apparent from the following detailed description of a preferred embodiment when taken in conjunction with the accompanying drawings wherein.

DETAILED DESCRIPTION OF THE DRAWINGS

Figure 1:
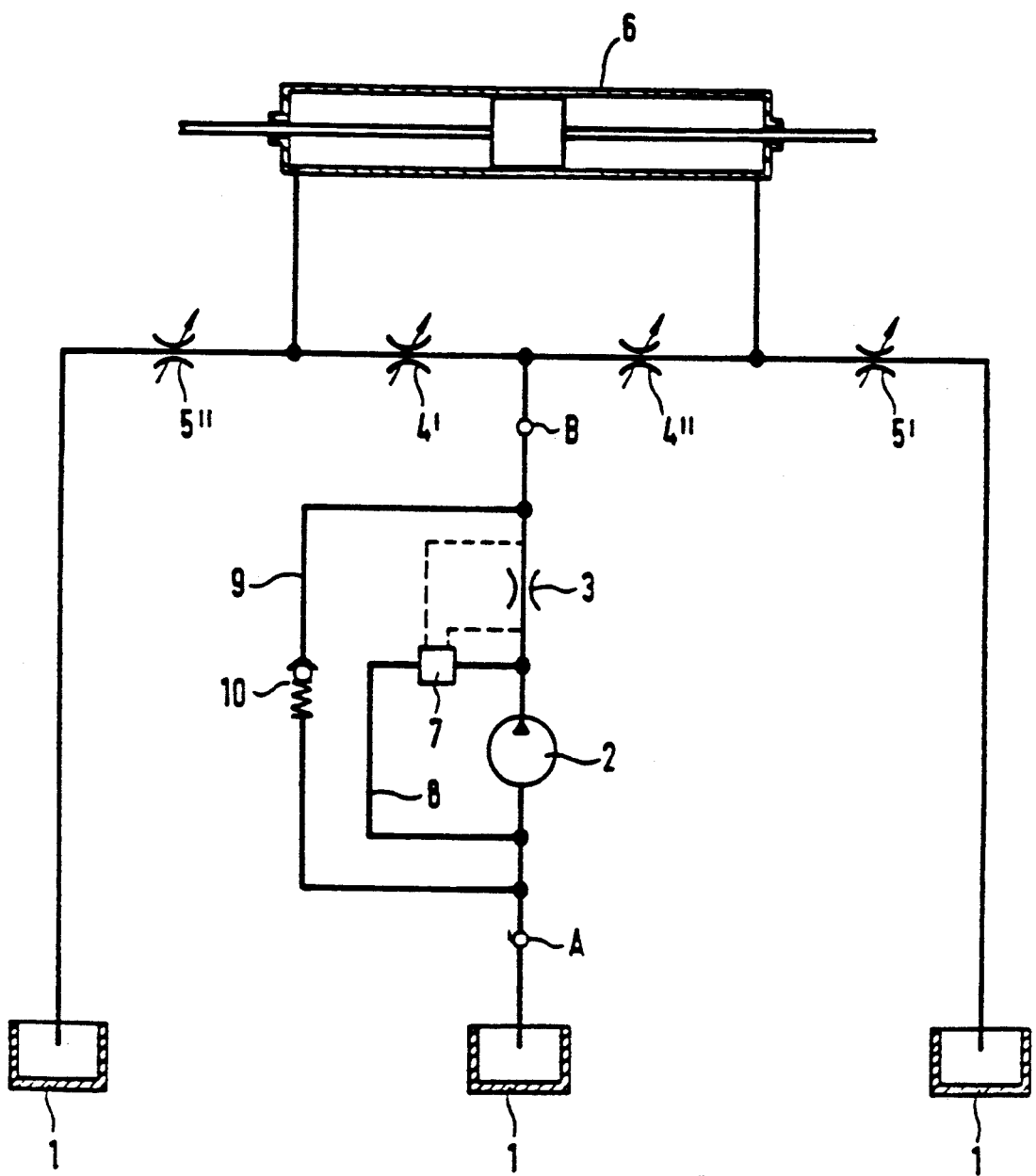
FIG. 1 is a schematic, circuit diagram of a power-assisted steering system of a motor vehicle.

FIG. 1 shows a pump 2 connected on the intake side to a reservoir 1 and on the delivery side, via a throttle 3, to two throttling sections leading to the reservoir 1. The throttling sections are formed by controllable throttles 4', 4", 5' and 5" which are controlled precisely by a steering wheel (not shown), such that the throttling resistance of the throttles 4' and 5' is changed (e.g. an increase) in one direction, while the throttling resistance of the other two throttles 4" and 5" at the same time experience a change in the other direction (e.g. a reduction). In the extreme case, a pair of throttles, e.g. the throttles 4' and 5', are closed, while the other pair of throttles, e.g. the throttles 4" and 5", are completely open. In normal straight driving of the vehicle, all the throttles are set to approximately the same throttling resistances.

Opposite sides of the service motor 6 are connected, on one hand, between the throttles 4' and 4", and, on the other hand, the throttles 4" and 5'. In the example of FIG. 1 the servo motor 6 is a double-acting piston-cylinder unit. Depending on the setting of the pairs of throttles 4' and 4' and 4" and 5", respectively, a greater or lesser hydraulic pressure differential acts on the piston of the servo motor 6, so that the piston is urged with greater or lesser force in one direction or the other. A maximum actuating force is achieved when one pair of throttles (e.g. pair 4', 5') is closed and the other pair of throttles (e.g. 4", 5") is completely open.

The pump 2 is driven by the vehicle engine (not shown) which runs at a varyingly high speed depending on driving state. In the extreme case, the engine runs either only at idling speed or at maximum speed. Thus, the pump 2 is driven with greatly variable speeds, and consequently the delivery capacity of the pump 2 is also subject to correspondingly great variations.

In order to adapt the flow of the hydraulic medium delivered to the throttles 4' to 5", and to the servo motor 6, the pump 2 is provided with either a closed-loop control arrangement or open-loop control arrangement 7. This has, on the one hand, a connecting path 8 leading directly from the delivery side of the pump 2 to its intake side. The degree of opening of the path 8 depends on the pressure drop at the throttle 3. A flow control piston 7 serves for controlling the degree of opening. A connecting line 9 is arranged in parallel with the connecting path 8 and is controlled by a pressure relief valve 10.

In the illustrated embodiment, the pressure relief valve 10 is configured so that it is not opened until there is a relatively high pressure which, as a rule, can only be reached if one of the pairs of throttles 4', 5' or 4'., 5"is closed and the piston of the servo motor 6 remains stationary, in particular because it has reached its respective end position. Without the pressure relief valve 10, the connecting path 8 could not be opened in this operating state because hydraulic medium could not flow off, via the delivery line of the pump 2, due to the closed one pair of throttles 4', 5' or 4", 5" and the stationary piston of the servo motor 6. Consequently, there could also be no pressure drop at the throttle 3, which drop is necessary for opening the connecting path 8.

Thus, the pressure relief valve 10, opening when appropriate, ensures under all circumstances that hydraulic medium constantly flows through the throttle 3 and that, correspondingly, there is at the throttle 3 a pressure drop, which for its part effects opening of the connecting path 8. In this operating state, however, great throttling resistances occur and result in the hydraulic medium being heated very considerably, at least when the pump 2 is running fast. This can cause extremely high temperatures, because the pump 2 only works in circulation operation, i.e. no fresh, cooled hydraulic medium is fed from the reservoir 1 to the pump 2.

With the present invention, however, overheating of the hydraulic medium in the pump 2 is avoided. In particular, the connecting path 8 and the connecting line 9 are also temperature-dependently controlled such that the throttling resistance in particular of the connecting path 8 is greatly reduced at relatively high temperature. The pump 2 then correspondingly only works against a comparatively low resistance, as a result of which a further temperature increase is prevented.

Figure 2:
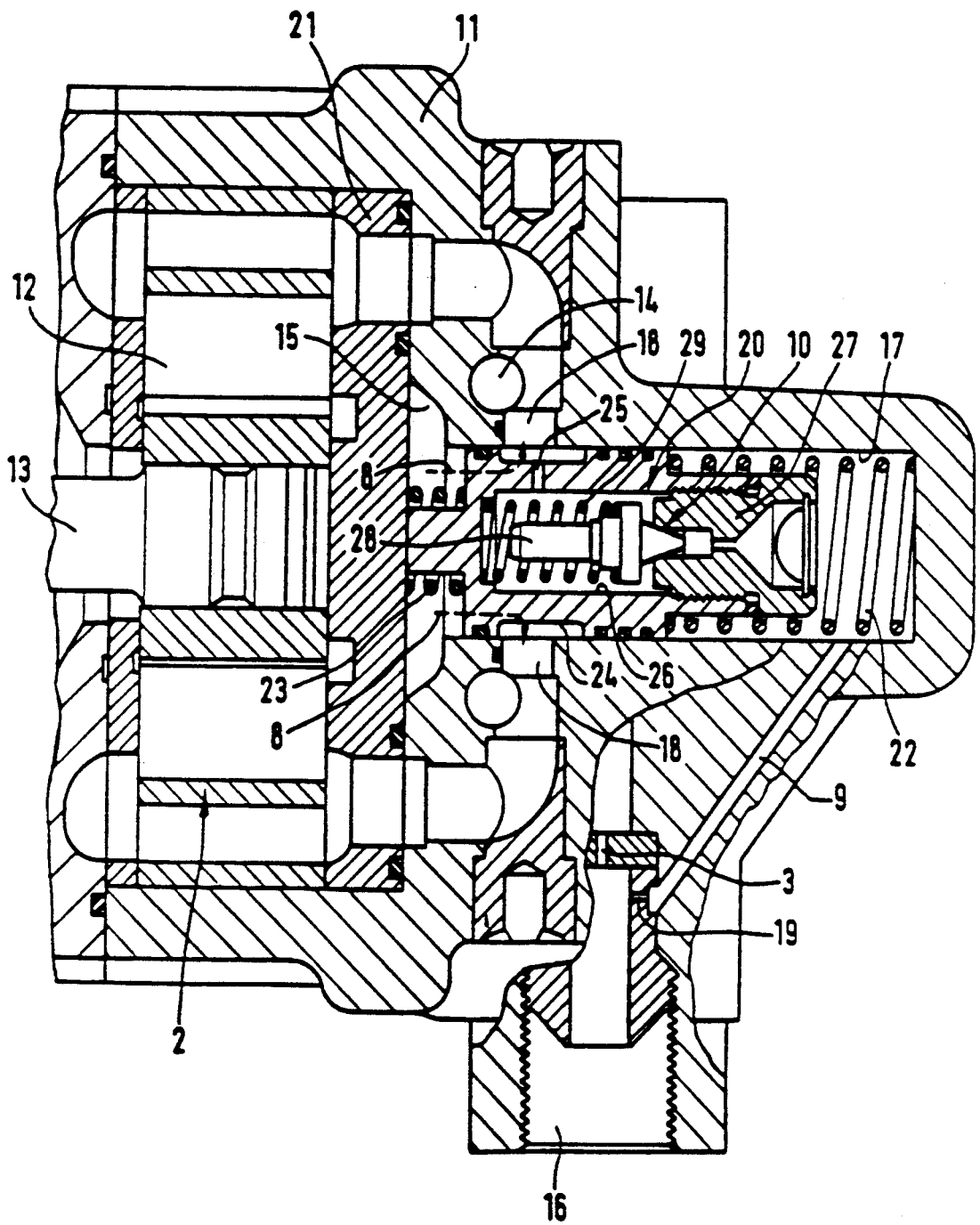
FIG. 2 is an axial sectional view of a servo pump with hydraulic flow control according to the present invention.

The pump 2 and the flow control arrangement 7 of FIG. 1, i.e. all elements between the interfaces A and B, can be accommodated in a single common housing 11, as shown in FIG. 2. The pump 2 can be a vane pump whose vanes 12 are driven by drive shaft 13 such that hydraulic medium is passed from an intake chamber 14 into a pump delivery chamber 15. An intake line (not visible), which connects the intake chamber 14 to the reservoir 1, shown in FIG. 1, opens out into the intake chamber 14. The delivery chamber 15 is arranged essentially concentrically to the axis of the drive shaft 13 and is connected, via housing bores (not visible), to a delivery line 16, in which the throttle 3 is arranged.

A cylindrical bore 17 arranged coaxially with the drive shaft 13 in the housing 11 and is open towards the delivery chamber 15 so as to communicate via radial bores 18 with the intake chamber 14. At its end remote from the delivery chamber 15, the bore 17 is connected via the connecting line 9 configured as a housing bore to a section of the delivery line 16 downstream of the throttle 3 (as viewed in the direction of flow of the hydraulic medium). The mouth of the connecting line 9 into the delivery line 16 constitutes a throttle 19.

A flow control piston 20 is arranged displaceably inside the bore 17 and, in its closed position shown FIG. 2, bears with a necked down extension on its right side against a side plate 21 of the pump 2 and, with its left end face, closes off the delivery chamber 15, or the end of the bore 17 on the delivery chamber side, with respect to the radial bores 18 and the intake chamber 14. If the flow control 20 in FIG. 2 is shifted sufficiently far to the right, the connecting path 8 between the delivery chamber 15 and the intake chamber 14 is opened, because the left end of the flow control piston 20 no longer protrudes far enough into the section of the bore 17 between the delivery chamber 15 and the radial bores 18.

A compression spring 22 urges the flow control piston 20 constantly toward the shown closed position and is clamped between the right end face of the flow control piston 20 and a bottom wall of the bore 17. This compression spring 22 operates virtually temperature-dependently.

A further compression spring 23 is made of a shape memory alloy to generate pronouncedly (or non-negligible) temperature-dependent actuating forces and is clamped between the other end face of the flow control piston 20 and the side plate 21 of the pump 2. At low temperature, the compressive stress of the compression spring 23 is negligible but at relatively high temperature, the compression spring 23 biases the flow control piston 20 to the right with substantial force.

The pressure relief valve 10 is arranged inside the flow control piston 20 and, in the opened state, connects the end of the bore 17 communicating with the connecting line 9 to an annular space formed by a circumferential groove 24 of the flow control piston 20. The space 24 in the position shown in FIG. 2, on one hand, overlaps the radial bores 18 and correspondingly communicates with the intake chamber 14, and, on the other hand, is connected via a radial bore 25 to an axial blind bore 26 of the flow control piston 20. The bore 26 receives a valve seat part 27 of the pressure relief valve 10 at its open end. Arranged axially movably inside the blind bore 26 is the valve body 28 of the pressure relief valve 10 which is stressed by a valve spring 29 against the valve seat part 27 such that a conical nipple formed on the valve body 28 can shut off the valve channel passing axially through the valve seat part 27. The valve spring 29 operates largely temperature-independently.

Figure 3:
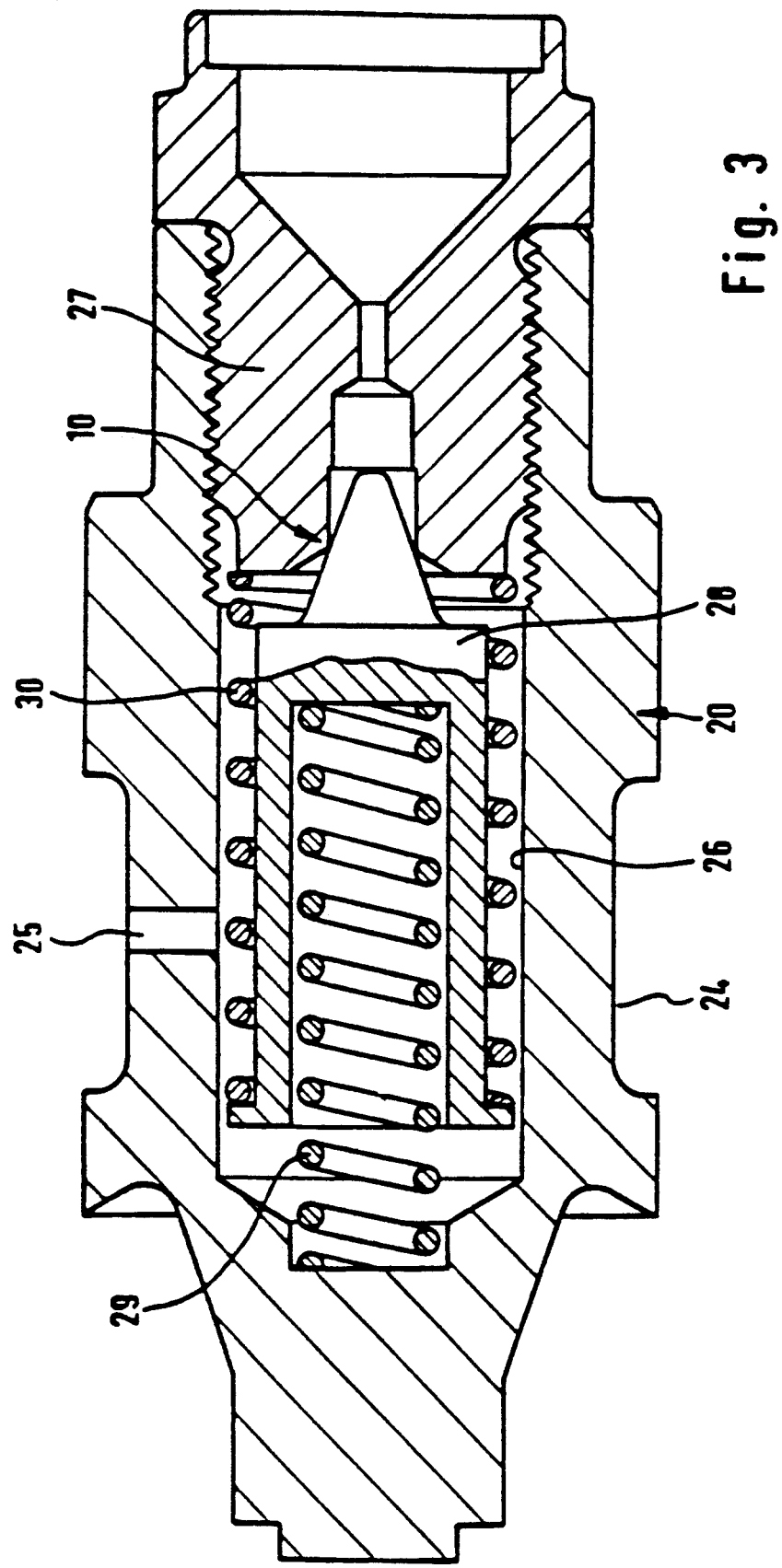
FIG. 3 is an axial sectional view of a second type of flow control piston with pressure relief valve arranged therein to interact with a spring of a shape memory alloy.
Figure 4:
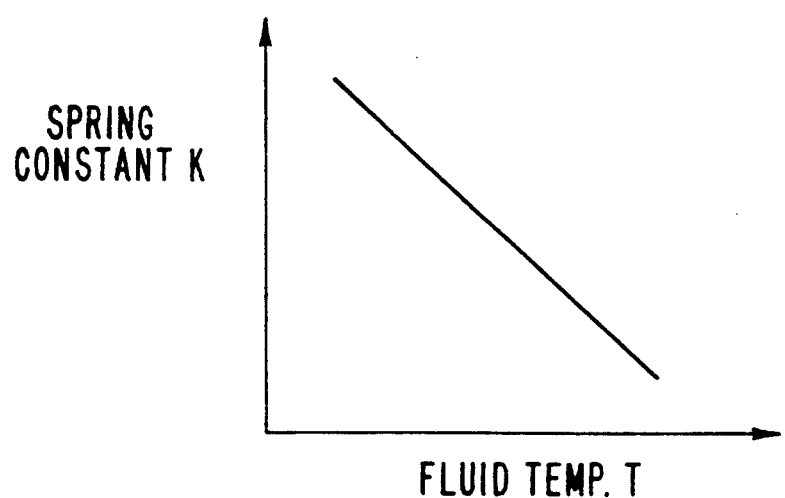

In FIG. 2, the valve body 28 of the pressure relief valve 10 has a rod-like extension protruding into the valve spring 29, which continuation limits the opening stroke of the valve body 28 in interaction with the bottom wall of the blind bore 26. In the embodiment of FIG. 3, a hollow valve body 28 surrounds the valve spring 29 in a sleeve-shaped region. The left end of the body 28 likewise limits its opening stroke of the valve body 28 by hitting the bottom of the blind bore.

A further compression spring 30 of a shape memory alloy is arranged on the outside of this sleeve-shaped section and is clamped under compression between the valve seat part 27 and an annular flange on the left end of the valve body 28. The compression spring 30 has a pronouncedly temperature-dependent behavior, such that the effect of the compression spring 30 is negligible at low temperature. Only at relatively high temperature does the compression spring 30 generate non-negligible spring forces to bias the valve body 28 toward the left in FIG. 3, in the sense of an opening of the pressure relief valve 10.

The embodiments of FIGS. 2 and 3 functions in the following manner. As long as hydraulic medium can flow off to a consumer system via the delivery line 16, a pressure drop occurs at the throttle 3 of the delivery line 16. That is, hydraulic pressure downstream of the throttle 3 in the direction of flow is distinctly less than upstream of the throttle 3. The pressure upstream of the throttle 3 corresponds to the extent possible to the pressure in the delivery chamber 15. Due to the pressure drop at the throttle 3, the mutually remote end faces of the flow control piston 20 are subjected to different hydraulic pressures, i.e. the left end face in FIG. 2 is loaded or acted upon by the high pressure of the delivery chamber 15, while the other or right-hand end face is subjected to the lower pressure, as prevails downstream of the throttle 3.

As soon as the pressure drop at the throttle 3 is large enough, i.e. as soon as the difference between the hydraulic pressures to which the end faces of the flow control piston 20 are subjected exceeds a threshold value, the flow control piston 20 is shifted to the right in FIG. 2 against the force of the compression spring 22, so that the connecting path 8 is opened with a larger or less large cross-section and a part of the hydraulic medium can flow over directly from the delivery chamber 15 to the intake chamber 14. It is thus ensured that the volume flow of the hydraulic medium discharged via the delivery line 16 to the consumer system is limited to a desired amount independently of the respective delivery capacity of the pump 2 which, under certain circumstances depending upon the vehicle engine speed, can run very fast.

As long as hydraulic medium flows off to the consumer system via the delivery line 16, the hydraulic medium is only heated insignificantly, if at all, inside the housing 11 because the hydraulic medium flowing from the reservoir 1 shown in FIG. 1 always ensures adequate cooling.

As soon as the consumer system connected to the delivery line 16 reaches an operating state in which no further hydraulic medium flow off any longer via the delivery line 16, virtually no pressure drop can occur at the throttle 3, so that a very high pressure also prevails downstream of the throttle 3 in the direction of flow. This pressure is transmitted via the connecting line 9 into the region of the bore 17 on the right-hand side of the flow control piston. As soon as a threshold value is reached, pressure relief valve 10 is opened so that hydraulic medium can flow off from the right end region of the bore 17 to the intake chamber 14, with hydraulic medium constantly flowing via the connecting line 9. This flow effects a pressure drop at the throttle 3, or at the throttle 19, so that the mutual end faces of the flow control piston 20 are in turn subjected to unequal pressures and the flow control piston 20 is shifted toward the opening direction. Thus, also in this situation, the connecting path 8 is again opened to a greater or lesser extent.

In this operating state, in which no hydraulic medium can flow off to the consumer system via the delivery line 16, and consequently also no fresh, cooled hydraulic medium can flow via the intake line to the pump 2, the hydraulic medium is exclusively passed in circulation by the pump 2, it being possible for very considerable heating to occur due to the throttles in the flow paths of the hydraulic medium. The associated temperature increase of the hydraulic medium effects a correspondingly considerable heating of the compression shape memory alloy springs 23 and 30, of FIGS. 2 and 3, respectively. The consequence is that these compression springs 23 and 30 become effective if a temperature threshold value is reached. The compression spring 23 thereby urges the flow control piston 20 directly into its opening position, and the compression spring 30 acts in the sense of an opening of the pressure relief valve 10, as a result of which the right end face in FIG. 2 of the flow control piston 20 is constantly relieved of the pressure and the comparatively high hydraulic pressure in the delivery chamber 15 can shift the flow control piston 20 into its opening position.

Thus, in each situation the connecting path 8 is opened relatively wide, so that the hydraulic medium can flow over via a short path and without excessive throttling resistance from the delivery chamber 15 to the intake chamber 14. Consequently, the circulation operation takes place against low throttling resistances, with the result that a further undesired temperature increase of the hydraulic medium which could destroy the pump 2, is avoided.

Only one of the shape memory alloy compression springs 23, 30 is necessary for reliable functioning. If both springs 23, 30 are provided, however, a redundant arrangement with particularly high reliability is achieved.

A further benefit of the present invention is that only slight modifications with respect to conventional designs are necessary. The arrangements represented in FIGS. 2 and 3 differ essentially from conventional arrangements primarily by the shape memory alloy springs 23 and 30.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Apparatus for open-loop and for closed-loop hydraulic flow control in a hydraulic system comprising:
   a variable speed pump operatively connected on an intake side to a reservoir and on a delivery side via a throttle to a consumer system;
   a flow control piston operatively arranged to control a connecting path between the intake side and the delivery side of the pump and actuatable by pressure of the delivery side into a position releasing the connecting path and by a restoring spring and the pressure downstream of the throttle into a position shutting off the connecting path; and
   a pressure relief valve with a shut-off member operatively arranged on the delivery side of the pump to release with throttling effect a connecting line leading to the intake side if a pressure threshold value is exceeded; wherein the connecting line branches off downstream of the throttle, and at least one of the flow control piston and the shut-off member of the pressure relief valve are actuated by at least one shape memory alloy spring having a pronouncedly temperature-dependent actuating force, such that the connecting path controlled by the flow control piston and the connecting line controlled by the pressure relief valve are released if a temperature of the hydraulic medium exceeds a threshold value.

2. The apparatus according to claim 1, wherein the at least one shape memory alloy spring has a negligible actuating force below the temperature threshold value and a non-negligible increasing actuating force above the temperature threshold value to actuate one of the flow control piston and the pressure relief valve in an opening direction.

3. The apparatus according to claim 1, wherein the at least one shape memory alloy spring is held in a delivery chamber of the pump between a stationary part and an end of the flow control piston on a delivery chamber side.

4. The apparatus according to claim 3, wherein the at least one shape memory alloy spring has a negligible actuating force below the temperature threshold value and a non-negligible increasing actuating force above the temperature threshold value to actuate one of the flow control piston and the pressure relief valve in an opening direction.

5. The apparatus according to claim 1, wherein the at least one shape memory spring is operatively arranged in the hydraulic flow path of the opened pressure relief valve in the opened state thereof.

6. The apparatus according to claim 5, wherein the at least one shape memory alloy spring has a negligible actuating force below the temperature threshold value and a non-negligible increasing actuating force above the temperature threshold value to actuate one of the flow control piston and the pressure relief valve in an opening direction.

7. The apparatus according to claim 1, wherein the pressure relief valve is accommodated inside the flow control piston between an inlet opening on an end face subjected to the pressure downstream of the throttle and a radial opening of the flow control piston leading to the intake side.

8. The apparatus according to claim 7, wherein the at least one shape memory alloy spring has a negligible actuating force below the temperature threshold value and a non-negligible increasing actuating force above the temperature threshold value to actuate one of the flow control piston and the pressure relief valve in an opening direction.

9. The apparatus according to claim 8, wherein the at least one shape memory alloy spring is held in a delivery chamber of the pump between a stationary part and an end of the flow control piston on a delivery chamber side.

10. The apparatus according to claim 8, wherein the at least one shape memory spring is operatively arranged in the hydraulic flow path of the opened pressure relief valve in the opened state thereof.

11. Apparatus for open-loop and for closed-loop hydraulic flow control in a hydraulic system, comprising:
a variable speed pump operatively connected on an intake side to a reservoir and on a delivery side via a throttle to a consumer system;
a connecting line branching off downstream of the throttle and leading to the intake side and being controlled by a pressure relief valve with a shut-off member to release said connecting line, if a pressure value is exceeded;
a flow control piston operatively arranged to control a connecting path between the intake side and the delivery side of the pump, said connecting path branching off upstream of said throttle, said control piston being actuatable by a pressure of the delivery side upstream of the throttle into a position releasing the connecting path and by a restoring spring and the pressure downstream of the throttle into a position shutting off the connecting path wherein;
at least one of the flow control piston and the shut-off member of the pressure relief valve are actuated by at least one shape memory alloy spring having a pronouncedly temperature-dependent actuating force, such that
the shape memory alloy spring of the control piston forces the control piston into the position releasing the connecting path, when a temperature of the hydraulic medium exceeds a threshold value,
the shape memory alloy spring of the pressure relief valve enables the shut-off member to release the connecting line, whereby a pressure acting on one side of the control piston for shutting off the connecting path is lowered in relation to the pressure upstream of the throttle acting on the other side of said piston to release the connecting path, when a temperature of the hydraulic medium exceeds a threshold value.

* * * * *